United States Patent Office 3,567,813
Patented Mar. 2, 1971

3,567,813
PROCESS FOR PREPARING COLOR AND MELT VISCOSITY STABLE POLYCARBONATE RESINS
John J. Keane and John M. Tome, Pittsfield, Mass., assignors to General Electric Company
No Drawing. Filed July 11, 1968, Ser. No. 743,984
Int. Cl. B29f 3/03; C08g 17/13, 53/20
U.S. Cl. 264—102                                    3 Claims

ABSTRACT OF THE DISCLOSURE

A process for preparing an aromatic carbonate polymer having excellent resistance to thermal discoloration and thermal degradation, which process involves incorporating 0.1–5.0 weight percent of water, based on the weight of the total composition with the aromatic carbonate polymer, and then extruding the mixture through a heated, vacuum vented extruder. A vacuum is applied to the mixture while in the molten state.

---

This invention is directed to a process for preparing an aromatic carbonate polymer which is resistant to thermal discoloration and thermal degradation. Specifically, the process involves extruding in a heated vacuum vented extruder, an aromatic carbonate polymer having incorporated therewith water.

Aromatic polycarbonate resins are fairly new thermoplastic polymers and have been known for their clear water-like appearance as well as their extreme resistance to impact and high strength. These particular polycarbonate resins and the process for preparing them are fully described in U.S. Pats. 3,028,365 and 3,290,409. However, the clear polycarbonate resin has certain drawbacks in that when the clear polycarbonate resin is molded, the resin exhibits yellowness or discoloration due to thermal conditions. This discoloration or yellowness seriously handcaps the use or applications of clear polycarbonate resins. Many means have been developed and patented in order to reduce or minimize the yellowness or discoloration that currently occurs with polycarbonate resin when subjected to elevated temperatures, which means generally employ additives to reduce and minimize this discoloration. The use of additives have been beneficial, but unfortunately, the additives have resulted in degradation of the resin as noted by a reduction of melt viscosity. By reducing melt viscosity, this seriously reduces the many advantages of the polycarbonate resin such as impact strength, etc. In addition, water or moisture even in small quantities has an adverse effect on a polycarbonate resin in that it seriously degrades, discolors and reduces the melt viscosity of the polycarbonate resin.

In spite of this, it has now been surprisingly discovered that by employing a minor amount of water with a polycarbonate resin and then extruding the resin through a vacuum vented extruder, the polycarbonate resin is resistant to discoloration when exposed to elevated temperatures or during molding is resistant to resin degradation.

Therefore, it is an object of this invention to provide a process for preparing an aromatic carbonate polymer which is resistant to thermal discoloration and to thermal degradation.

Another object of this invention is to provide a process for preparing an aromatic carbonate resin which is resistant to thermal discoloration and to thermal degradation by extruding the polycarbonate resin having water associated therewith through a heated vented screw extruder.

Yet another object of this invention is to provide a polycarbonate resin which is resistant to thermal discoloration and to thermal degradation prepared by the process of this invention.

Other objects and advantages of this invention will become apparent from the following detailed description thereof.

Briefly, according to this invention, the foregoing and other objects are attained by extruding an aromatic carbonate polymer having incorporated therewith at least 0.1 weight percent of water through a heated, vented screw extruder and applying a vacuum to the polymer while in the molten state. The novel and critical feature of the instant invention is the fact that the aromatic carbonate polymer must have incorporated therewith at least 0.1 weight percent and preferably about 0.1–5.0 weight percent of water. It has also been found that if too much water is employed, it may have a degrading affect on the polymer and may not produce the desired results. Thus the upper limit on the amount of water to be employed is that maximum amount which will not produce a degrading affect upon the polymer when practicing the invention herein. Preferably the amount of water to be employed is about 0.1–5.0 weight percent. While it is not fully understood why the incorporation of water results in the advantages so obtained since water has such an adverse effect on a polycarbonate, it is believed that in the removal of the water through the venting means of the screw extruder aids in removing impurities such as color bodies and other ingredients that tend to form color bodies. However, this is only a theory and it is not intended that the invention be limited thereto.

The following examples are set forth to illustrate more clearly the principle and practice of this invention to those skilled in the art. Unless otherwise expressed, where parts are mentioned, they are parts by weight.

EXAMPLE I

Part A 100 parts of a polycarbonate resin, prepared by reacting equimolar amounts of 2,2-bis(4-hydroxyphenyl)propane and phosgene as disclosed in Example I of U.S. Pat. 3,290,409 but having an intrinsic viscosity of 0.46 as measured in dioxane at 30° C., is blended with 1 part of water in a laboratory mixer. The blend is fed to the feed hopper of a heated vacuum vented screw extruder, which is at a temperature of about 500° F. A vacuum equivalent to 27 inches of mercury is applied to the extruder at the vent in the extruder. When hte polycarbonate resin is in this part of the extruder, it is in the molten state. The polycarbonate is extruded, comminuted into pellets and then injection molded into clear transparent test samples 2 inches by 1½ inch by ⅛ inch thick. Test samples are separately molded at 650° F. and at 700° F. respectively. Other test samples are molded at 700° F. after holding the polycarbonate at a temperature of 700° F. for 15 minutes in the reservoir of an injection molding machine just prior to injection molding the samples. The samples molded at 650° F. are further exposed to a temperature of about 284° F. for 48 hours and 96 hours. Color is determined on all test samples by comparison of solutions of the test samples (3 grams in 50 cc. of methylene chloride) with the American Public Health Association's (APHA) water color standard. The higher the number, the greater the discoloration.

All of these test samples are designated as Vacuum Vent.

Part B

Part A above is repeated except that no water is used with the polycarbonate resin and the vent in the extruder is closed to the atmosphere while extruding. No vacuum is applied to the extruder.

The samples so prepared herein are designated as Non-Vent.

Part C

The average results of testing the samples prepared in Parts A and B are as follows:

TABLE 1

| Sample | APHA color as molded | | | APHA heat aged color | |
|---|---|---|---|---|---|
| | 650° F. | 700° F. | 700° F. +15 min. | 48 hrs. | 96 hrs. |
| Non-vent | 39 | 43 | 99 | 94 | 124 |
| Vacuum vent | 26 | 30 | 79 | 65 | 87 |

EXAMPLE II

Example I is repeated except that the polycarbonate employed is one having an intrinsic viscosity of 0.51 as measured in dioxane at 30° C. The results are as follows:

TABLE 2

| Sample | APHA color as molded | | | APHA heat aged color | |
|---|---|---|---|---|---|
| | 650° F. | 700° F. | 700° F. +15 min. | 48 hrs. | 96 hrs. |
| Non-vent | 25 | 27 | 93 | 55 | 76 |
| Vacuum vent | 18 | 21 | 49 | 35 | 50 |

EXAMPLE III

Part A

Part A of Example I is repeated except that the test samples are molded at 650° F. only and tested for APHA color as molded and after exposure to 284° F. for various periods of time as indicated in Table 3 below.

The samples are designated as Vacuum Vent.

Part B

Part A above is repeated except that no water is used with the polycarbonate resin and a vacuum is not applied to the extruder but the vent is left *open* to the atmosphere.

The samples are designated as Open Vent.

Part C

The average results of testing the above samples are as follows:

TABLE 3

| Sample | APHA color as molded | APHA color after 284° F. | | |
|---|---|---|---|---|
| | | 1 day | 5 days | 7 days |
| Open vent | 58 | 76 | 92 | 100 |
| Vacuum vent | 28 | 30 | 35 | 39 |

This invention is directed to a process for preparing an aromatic carbonate polymer having improved resistance to thermal discoloration and thermal degradation, which process consists of extruding an aromatic carbonate polymer, having associated therewith at least 0.1 weight percent of water based on the weight of the carbonate polymer, through a heated vacuum vented extruder. More specifically, the process consists of (a) mixing an aromatic carbonate polymer with about 0.1–5.0 weight percent of water based on the weight of the carbonate polymer, (b) feeding the mixture to a heated vacuum vented screw extruder, (c) heating the mixture to a temperature at which the carbonate polymer becomes molten within the extruder while advancing the mixture toward the discharge end thereof, (d) applying a vacuum to the mixture and (e) extruding the aromatic carbonate polymer. As shown from the examples, a carbonate polymer provided by the process disclosed herein has much greater resistance to thermal discoloration and thermal degradation than a carbonate polymer that is merely extruded without water and without a vacuum being applied to the carbonate polymer while in the molten state with-in the extruder. In fact, Example III shows that even by just venting the extruder to the atmosphere is not sufficient to render the aromatic carbonate polymer resistant to thermal discoloration. The critical feature of the instant invention is that water must be employed with the carbonate polymer and that a vacuum must be applied to the mixture. In fact, the melt viscosity of a polycarbonate resin prepared in accordance with the instant invention as measured over a 20-minute period at 600° F. shows little or no drop in melt viscosity showing that the resin is resistant to thermal degradation. A resin as prepared in Example I, Part B has about a 20% drop in melt viscosity as measured above over a 20-minute period, which clearly shows that the resin degraded due to being exposed to elevated temperatures. As melt viscosity drops, the properties of a polycarbonate resin are adversely affected. It is desirable to have the melt viscosities remain essentially constant when the polycarbonate resin is exposed to elevated temperatures.

More specifically in carrying out the process of the instant invention, an aromatic carbonate polymer is fed to the feed hopper of an extruder. The extruder is run at a temperature of from approximately 400° F. to about 700° F. The aromatic carbonate polymer as it is advanced through the extruder, is heated to a temperature which transforms the polymer into a molten state. The temperature is that temperature within the extruder and may well be above that temperature which at atmospheric pressure is sufficient to transform a solid carbonate polymer into a molten state. While in the molten state, a vacuum is applied to the carbonate polymer. The vacuum applied can generally be any sufficient vacuum to provide a carbonate polymer having excellent resistance to thermal discoloration and thermal degradation. Generally a vacuum equivalent to at least 20 inches of mercury would appear to be the preferred vacuum. The molten carbonate polymer is then further advanced to the discharge end of the extruder. At the discharge end of the extruder, the carbonate polymer can be extruded into either sheet form, or into a strand which may be comminuted into pellets or injected directly into a mold to produce molded shapes or blow molded into a film or container. While the process of this invention is particularly applicable to clear polycarbonate resin, the process is also applicable to pigmented polycarbonate resins. The aromatic carbonate polymer employed herein is a polycarbonate material that is described and disclosed in U.S. Pats. 3,028,365, 3,030,331, 3,169,121 and 3,290,409. Briefly, such aromatic carbonate polymers are prepared by reacting a dihydric phenol with a carbonate precursor, which carbonate precursor may be either a carbonyl halide, a carbonate ester or a haloformate. The carbonyl halides may consist of carbonyl chloride, carbonyl bromide or carbonyl fluoride. Typical of the carbonate esters are diphenyl carbonate, di-(halophenyl) carbonates such as di-(chlorophenyl) carbonate, di-(bromophenyl) carbonate, di-(trichlorophenyl) carbonate, di-(tribromophenyl) carbonate, etc., di-(alkylphenyl) carbonates such as di-(tolyl) carbonate, etc., di-(naphthyl) carbonate, di-(chloronaphthyl) carbonate, phenyl tolyl carbonate, chlorophenyl chloronaphthyl carbonate, etc. or mixtures thereof. The haloformates may consist of bishaloformates of dihydroxy aromatic compounds (bischloroformates of hydroquinone, etc.) or glycols (bishaloformates of ethylene glycol, neopentyl glycol, propylene glycol, etc.), preferably phosgene is employed to prepare the aromatic carbonate polymers employed in the practice of this invention.

Briefly, the dihydric phenols which can be employed to prepare the aromatic carbonate polymers employed herein are mononuclear or polynuclear aromatic compounds containing as functional groups two hydroxy radicals, each of which is attached directly to a carbon atom of an aromatic nucleus and are bisphenols such as 1,1-bis(4-hydroxyphenyl)-methane, 2,2 - bis(4-hydroxyphenyl)-propane, 2,2-bis(4-hydroxy - 3 - methylphenyl)-propane, 4,4- bis(4-hydroxyphenyl)-heptane, etc., dihydric phenol ethers such as bis(4-hydroxyphenyl)-ether, bis(3,5 - dichloro-4-hydroxyphenyl)-ether, etc., dihydroxy diphenyls such as p,p'-dihydroxydiphenyl, 3,3'-dichloro - 4,4' - dihydroxydiphenyl, etc., dihydroxyaryl sulfones such as bis (4-hydroxyphenyl)-sulfone, bis(3,5-dimethyl-4-hydroxyphenyl) - sulfone, bis(3-methyl-5-ethyl-4-hydroxyphenyl)-sulfone, etc., dihydroxy benzenes, resorcinol, hydroquinone, halo- and alkyl-substituted dihydroxy benzenes such as 1,4-dihydroxy-2-chlorobenzene, 1,4 - dihydroxy - 2,3 - dichlorobenzene, 1,4-dihydroxy-3-methylbenzene, etc., and dihydroxy diphenyl sulfoxides such as bis(4-hydroxyphenyl)-sulfoxide, bis(3,5 - dibromo-4-hydroxyphenyl)-sulfoxide, etc. A variety of additional dihydric phenols are also available to provide carbonate polymers and are disclosed in U.S. Pats. 2,999,835, 3,028,365 and 3,153,008. It is, of course, possible to employ two or more different dihydric phenols or a copolymer of a dihydric phenol with glycol, an hydroxy or an acid terminated polyester, or a dibasic acid in the event a carbonate copolymer or interpolymer rather than a homopolymer is desired for use in the preparation of the aromatic carbonate polymers of this invention.

The reaction may be carried out in the presence of an acid acceptor and a molecular weight regulator. The acid acceptor may be either an organic or an inorganic compound. A suitable organic acid acceptor is a tertiary amine and includes such materials as pyridine, triethylamine, dimethylaniline, tributylamine, etc. The acid acceptor may be one which can be either an hydroxide, a carbonate, a bicarbonate or a phosphate of an alkali or alkaline earth metal. The molecular weight regulators which may be employed in carrying out the process for preparing the aromatic polycarbonate resins can be such molecular weight regulators as phenol, cyclohexanol, methanol, para-tertiary butylphenol, para-bromophenol, etc. Preferably, phenol may be employed as the molecular weight regulator.

The aromatic carbonate polymers are useful in preparing either a clear transparent or a pigmented article. They may be used to prepare sheets for glazing or for signs. Molded shapes can also be prepared from such polymers wherein the molded shapes would be resistant to thermal discoloration and thermal degradation.

It will thus be seen that the objects set forth above among those made apparent from the preceding description are efficiently attained and certain changes may be made in carrying out the above process and in the composition set forth without departing from the scope of this invention, it is intended that all matters contained in the above description shall be interpreted as illustrative and not in a limiting sense.

What is claimed is:

1. A process for preparing an aromatic carbonate polymer having improved resistance to thermal discoloration, which process consists of (a) forming a blend consisting essentially of a solid aromatic carbonate polymer and 0.1–5.0 weight percent water based on the weight of the aromatic carbonate polymer, (b) feeding the aromatic carbonate polymer to a heated, vacuum vented screw extruder, (c) heating the aromatic polycarbonate polymer to at least a temperature at which the polymer becomes molten while advancing the polymer toward the discharge end of the extruder, (d) applying a vacuum to the polymer while in the molten state within the extruder and (e) extruding the polymer.

2. The process of claim 1 wherein the extruder is a double vented extruder and the vacuum is applied to both vents.

3. The process of claim 1 wherein the aromatic carbonate polymer is a clear polycarbonate of 2,2-bis(4-hydroxyphenyl)propane and carbonyl chloride.

References Cited

UNITED STATES PATENTS 3,267,075   8/1966   Schnell et al. _____ 264—102X

FOREIGN PATENTS 897,201   5/1962   Great Britain _____ 260—47X

ROBERT F. WHITE, Primary Examiner

J. S. SILBAUGH, Assistant Examiner

U.S. Cl. X.R.

260—47; 264—176